(12) United States Patent
Cenizal et al.

(10) Patent No.: US 9,344,151 B2
(45) Date of Patent: May 17, 2016

(54) POWER LINE COMMUNICATION MONITOR

(71) Applicant: Facebook, Inc., Menlo Park, CA (US)

(72) Inventors: David Cenizal, Santa Clara, CA (US);
Rahul Anilkumar, Pullman, WA (US)

(73) Assignee: Facebook, Inc., Menlo Park, CA (US)

( * ) Notice: Subject to any disclaimer, the term of this patent is extended or adjusted under 35 U.S.C. 154(b) by 236 days.

(21) Appl. No.: 13/683,120

(22) Filed: Nov. 21, 2012

(65) Prior Publication Data

US 2014/0143578 A1  May 22, 2014

(51) Int. Cl.
| | |
|---|---|
| *G06F 11/30* | (2006.01) |
| *H04B 3/56* | (2006.01) |
| *G06F 1/30* | (2006.01) |
| *H02J 13/00* | (2006.01) |
| *H02J 3/00* | (2006.01) |
| *H01R 4/24* | (2006.01) |

(52) U.S. Cl.
CPC .. *H04B 3/56* (2013.01); *G06F 1/30* (2013.01); *H02J 3/005* (2013.01); *H02J 13/00* (2013.01); *H01R 4/24* (2013.01); *H04B 2203/5458* (2013.01); *H04B 2203/5487* (2013.01); *Y10T 29/49117* (2015.01)

(58) Field of Classification Search
CPC .......................... H04B 2203/5433; H01R 4/24
USPC ......... 324/115; 340/870.03, 870.02; 713/300, 713/320; 707/769; 702/62; 165/121; 700/292
See application file for complete search history.

(56) References Cited

U.S. PATENT DOCUMENTS

| | | | |
|---|---|---|---|
| 7,248,158 B2 | 7/2007 | Berkman et al. | |
| 7,276,915 B1 | 10/2007 | Euler et al. | |
| 7,401,644 B2 * | 7/2008 | Ziarnik | G06F 1/206 165/121 |
| 8,756,441 B1 * | 6/2014 | Mullins et al. | 713/300 |
| 2007/0213879 A1 * | 9/2007 | Iwamura | H04B 3/54 700/292 |
| 2008/0148081 A1 * | 6/2008 | Diab et al. | 713/320 |
| 2009/0140721 A1 * | 6/2009 | Garland et al. | 324/115 |
| 2011/0040785 A1 * | 2/2011 | Steenberg et al. | 707/769 |
| 2011/0125432 A1 * | 5/2011 | Pomerantz | G05B 19/058 702/62 |
| 2011/0221423 A1 * | 9/2011 | Lund | 324/115 |
| 2012/0001768 A1 * | 1/2012 | Radosavljevic et al. | 340/870.03 |
| 2012/0045988 A1 * | 2/2012 | Blanton et al. | 455/39 |
| 2012/0123711 A1 * | 5/2012 | Fausak | H04B 3/546 702/62 |
| 2012/0223840 A1 * | 9/2012 | Guymon | H04B 3/54 340/870.02 |

* cited by examiner

*Primary Examiner* — Aurel Prifti
(74) *Attorney, Agent, or Firm* — Perkins Coie LLP (57) ABSTRACT

A method of deployment of a power monitor system includes: coupling a monitor device that has a measurement component to a power line communication device for communicating a physical quantity measured by the measurement component across a power line; inserting a connection tap of an electrical access device into the power line through an insulation sheath to a conductor within the power line; attaching the electrical access device to the power line; and coupling electrically the electrical access device to the monitor device and the power line communication device.

10 Claims, 10 Drawing Sheets

POWER LINE COMMUNICATION MONITOR

FIELD OF INVENTION

This invention relates generally to a monitor system, and in particular to a remote power monitor system.

BACKGROUND

In recent years, the need for data storage has increased dramatically. With the increase in demand for data storage, data centers everywhere have to face new physical and logical challenges in managing the storage media.

Data centers can be proprietary enterprise datacenters or collocation space. In either situation, monitoring of the data center environment and equipment is crucial to maintaining a properly functioning data center. Monitoring can include keeping track of a power voltage level of a power supply, a power current level of a power supply, a temperature, a humidity level, or any combination thereof. Existing monitor systems tend to be difficult to install. Complicated wiring of the monitor sensors and monitor stations increases the cost of installation of these traditional monitor systems. No specific solutions have been found to resolve these challenges adequately.

SUMMARY

The techniques introduced here enable easy deployment of a monitor terminal in a data center. The monitor terminal is a device for measuring and tracking one or more physical quantities of an environment or equipment and reporting the one or more physical quantities back to a central monitor station. The monitor terminal can also proactively modify the environment or equipment based on the tracked physical quantities. For example, the monitor terminal can be use to track and manage power quality through a power cable.

In particular, these techniques enable coupling of the monitor terminal to a power cable in the data center for providing monitoring at various locations of the power cable and for communicating the monitor data information back to the central monitor station over power line communication. Power line communication is a method of modulating a signal for communication purposes through a power cable without affecting proper functioning of power delivery. Conventional monitor terminals are wired individually to connect to the central monitor station. This makes it costly and difficult to deploy monitor terminals near equipments in the data center.

Therefore, to allow ease of deployment of monitor terminals to power cable loads, such as data storage equipments, a mechanism to deploy power line communication monitor terminals is introduced here. This mechanism allows an electrical access device to be connected to any point on the power cable, such as by stripping part of the power cable to insert a connection tap. This mechanism allows electrical access near the load of the power cable. This approach also allows the monitor terminal that is electrically coupled to the electrical access device to communicate via power line communication. The electrical access device coupled to the monitor terminal, therefore, can provide power to the monitor terminal, can provide a communication channel from the monitor terminal to external systems, and can provide an opportunity for the monitor terminal to track the power usage and status along the power cable.

In the solution intended here, a power monitor system can include: a power line communication device to communicate messages across a power line. A monitor device can be coupled to the power line communication device. The monitor device can include a measurement component. An electrical access device can couple to the power line, wherein the electrical access device includes a connection tap inserted into the power line through a first insulation sheath to a first conductor within the power line. The connection tap can be electrically coupled to the power line communication device and the monitor device.

In another embodiment, a method of deployment of a power monitor system can include coupling a monitor device that has a measurement component to a power line communication device for communicating a physical quantity measured by the measurement component across a power line. The method can also include inserting a connection tap of an electrical access device into the power line through an insulation sheath to a conductor within the power line and attaching the electrical access device to the power line. Then the electrical access device can be electrically coupled to the monitor device and the power line communication device.

In yet another embodiment, a method of operating a power monitor system can include: measuring a physical quantity with a measurement component of a monitor device; communicating measurement messages across a power line with a power line communication device; and powering the monitor device and the power line communication device through an electrical access device coupled to the power line, the electrical access device having a connection tap inserted into the power line through an insulation sheath to a conductor within the power line.

Some embodiments have other aspects, elements, features, and steps in addition to or in place of what is described above. These potential additions and replacements are described throughout the rest of the specification.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

References in this description to "an embodiment", "one embodiment", or the like, mean that the particular feature, function, or characteristic being described is included in at least one embodiment of the present invention. Occurrences of such phrases in this specification do not necessarily all refer to the same embodiment, nor are they necessarily mutually exclusive.

Figure 1:
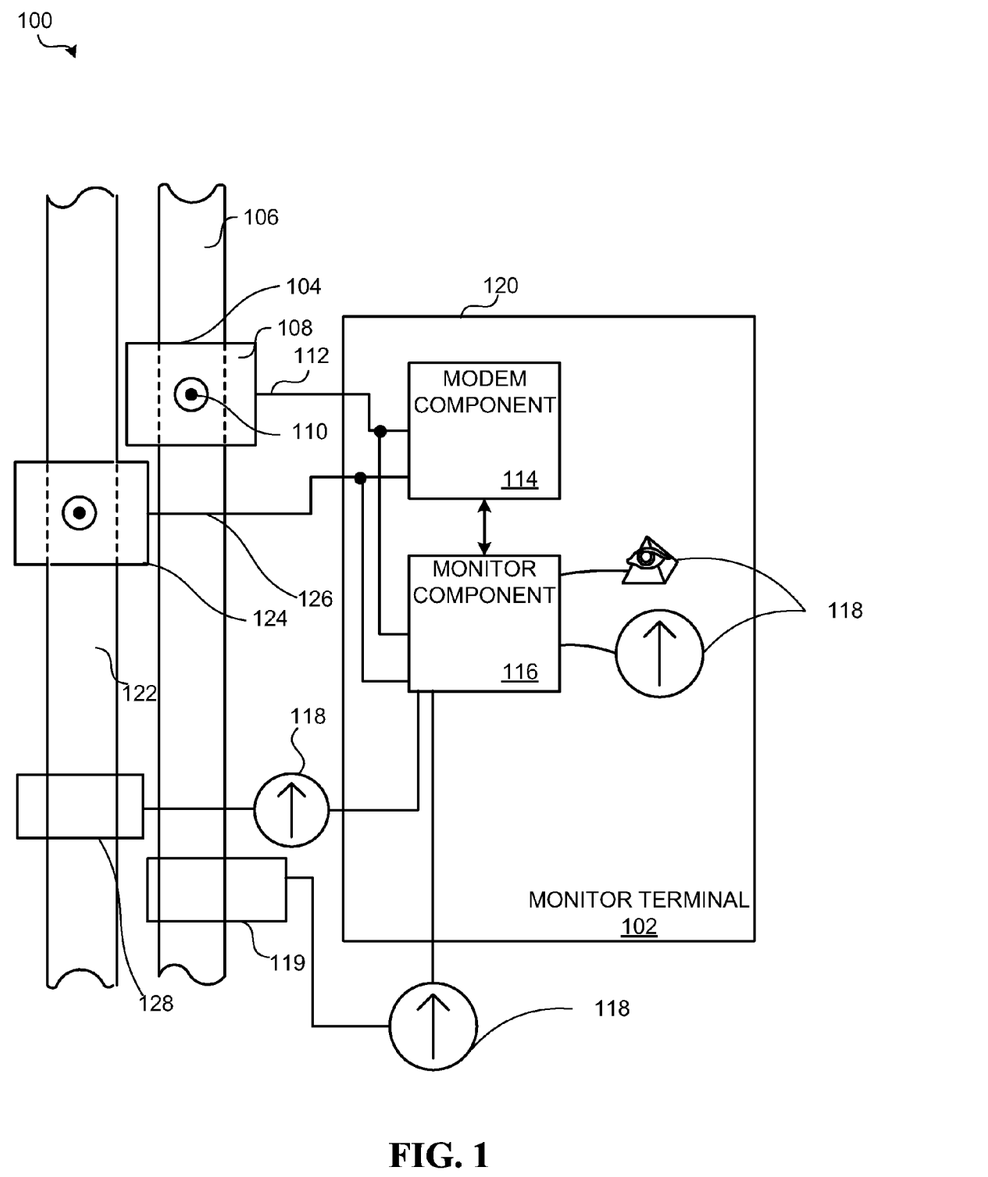
FIG. 1 illustrates a power line communication monitor system.

Referring now to FIG. 1, therein is shown a power line communication monitor system 100. The power line communication monitor system 100. The power line communication monitor system 100 can be an assembly of devices and components for measuring one or more physical properties, such as temperature, electric current, electric voltage, electric power, acceleration, direction, orientation, impact, pressure, lighting condition, moisture, or any combination thereof.

The power line communication monitor system 100 can include a monitor terminal 102. The monitor terminal 102 is a device for measuring and tracking one or more physical quantities of an environment or equipment and reporting the one or more physical quantities back to a central monitor station. The monitor terminal can also optional proactively modify the environment or equipment based on the tracked physical quantities. The monitor terminal 102 is modular and portable, capable of being removed and functionally installed at a different location, such as without soldering or without reconfiguring an external system.

The monitor terminal 102 is coupled to an electrical access device 104. The electrical access device 104 is a structure that can secure itself to a power cable 106 and be electrically connected to a conductive wire within the power cable 106. The power cable 106 is a power line for delivery of electrical power. The power cable 106 is a cable, at least one parameter of which is to be monitored in the illustrated example. The power cable 106 includes an insulation sheath around the conductive wire, where the conductive wire is for delivering power to electronic devices.

The electrical access device 104 includes an attachment body 108. The attachment body 108 is for securing the electrical access device 104 to the power cable 106. The attachment body 108, for example, can be a cradle, a clip, a strap, a ring, a tape, a pin, a knob, or any combination thereof. As a specific example, the attachment body 108 can be a connector formed according to the Splicing Wire Connectors UL Standard 486C.

The electrical access device 104 includes an electrical access connector 110. The electrical access connector 110 is conductive. The electrical access connector 110 is for providing electrical access to the conductive wire within the power cable 106. The electrical access connector 110 penetrates the insulation sheath of the power cable 106 and is in direct contact with the conductive wire within the power cable 106. For example, the electrical access connector 110 can be one or more struts.

The electrical access connector 110 electrically connects to a communication interconnection 112 running from the electrical access device 104 to the monitor terminal 102. The communication interconnection 112, similar to the power cable 106, is a power delivery apparatus having two or more ends that are electrically connected to each other. For example, the communication interconnection 112 can be a wire, a cable, a bundle of wires that are electrically connected to each other, a multi-pronged wire with more than two ends, or any combination thereof. The communication interconnection 112 can optionally connect directly with a connector-end receptor at the electrical access connector 110. The connector-end receptor is a structure to secure and connect the communication interconnection 112 with the electrical access connector 110. For example, the connector-end receptor can be a socket, a hook, a clamp, a plug, a male plug, a female socket, or any combination thereof. The communication interconnection 112 can include one or more wires with insulation sheaths.

The monitor terminal 102 can include a modem component 114. The modem component 114 is for providing power line communication through the communication interconnection 112 to and from the monitor terminal 102, including decoding incoming signals and encoding outgoing signals. Power line communication is a method of modulating a signal for communication purposes through a power cable without affecting proper functioning of power delivery. The modem component 114 can be connected to the communication interconnection 112 from the electrical access device 104. Optionally, the modem component 114 can be attached directly to the electrical access device 104. The modem component 114 includes a modem-end receptor for connecting with the communication interconnection 112. For example, the modem-end receptor can be a socket, a hook, a clamp, a plug, a male connector, a solder pad, a female connector, or any combination thereof.

The modem component 114 can include a power source, such as a battery to power a processor and a memory of the modem component 114. Alternatively, the modem component 114 can be powered by the communication interconnection 112 it is connected to. In that case, the battery can be used to initialize the modem component 114. The modem component 114 can also include a demodulator, a modulator, an amplifier, one or more filters, a system clock for synchronization, a power pulse reader, or any combination thereof.

The communication interconnection 112 can deliver an alternating current (AC), a direct current (DC), or a ground connection, or any combination thereof. The modem component 114 can be powered through the communication interconnection 112.

The modem component 114 can adhere to a power line communication protocol, such as HomePlug Powerline Alliance, Institute of Electronic and Electrical Engineers (IEEE) Standard 1901, SAE J1772, ITU-T G.hN, or any combination thereof. Communication signals through the communication interconnection 112 can be encoded and decoded in accordance with the power line communication protocol.

The monitor terminal 102 includes a monitor component 116. The monitor component 116 is for collecting measurements of one or more physical quantities from one or more sensors 118. The monitor component 116 can be powered through the communication interconnection 112. The monitor component 116 can include a storage memory for storing the measurements collected. The monitor component 116 can be coupled to the modem component 114 to communicate the measurements to the external system and to receive feedback or commands from the external system. Optionally, the monitor component 116 or the sensors connected to the monitor component 116 can be attached to the modem component 114.

The monitor component 116 is coupled to one or more sensors 118 for measuring the one or more physical quantities. For example, the one or more sensors 118 can include an electrical current reader or an electrical voltage reader that reads the current and voltage information of the power cable 106, respectively, without interfering with the supply of power. The electrical current reader can be coupled to a current transformer 119 attached to the power cable 106. The monitor component 116 can also be coupled to an external sensor or measurement component located proximate to a load of the power cable 106.

The one or more of the sensors 118 can be partially or entirely included in the monitor terminal 102. Some or all of the one or more sensors 118 can also externally couple to the monitor terminal 102. These sensors can be coupled to and operated by the monitor component 116. Each of the sensors 118 is a measurement component or a converter that measures one or more physical quantities and converts it into a signal which can be read by an observer, the monitor component 116, an instrument, or an external system. The physical quantity can include mechanical, electrical, chemical, or biological quantities. For example, the sensor can include a thermometer, a camera, a voltmeter, a tactile sensor, an accelerometer, a gyroscope, a current transformer, a pressure sensor, or any combination thereof.

The monitor component 116 can also be coupled to switches, actuators, controllers, sensors, or any combination thereof. The monitor component 116 can operate or adjust the switches, actuators, controllers, or sensors based on an external command received via the modem component 114. The monitor component 116 can also operate or adjust the switches, actuators, controllers, or sensors based on the one or more physical quantities meeting one or more thresholds. For example, the monitor component 116 can be coupled to a fan speed adjustment device attached to a cooling fan proximate to a load of the power line. The monitor component 116 can adjust the fan speed based on a reading of nearby temperature.

Communication between the monitor component 116 and a central monitor station via power line communication of the modem component 114 has been discovered to reduce cost of cabling and increase communication speed. The monitor component 116 can utilize the modem component 114 to report the measurements from the sensors to a central monitor station. Use of the electrical access device 104 allows the modem component 114 and the monitor component 116 to be connected to any portion of the power cable 106.

The monitor terminal 102 can include a shell 120. The shell 120 is a structure at an exterior of the monitor terminal 102 for protecting the monitor terminal 102 and confining active components within the monitor terminal 102. The shell 120 can be made of any of various non-conductive solid materials, including plastic, rubber, ceramic, glass, or a combination thereof. The shell 120 can include one or more openings for one or more of the communication interconnection 112. The shell 120 can be attached to a nearby structure. For example, the shell 120 can include holes for nails or screws. The shell 120 can also include a smooth surface for adhesive tapes.

The monitor terminal 102 can block electrical noise and/or interference by a conductive shield. Such shield can include a conductive sheath separated by insulation around the power cable 106, the communication interconnection 112, the electrical access connector 110, or any combination thereof. The monitor terminal 102 can also include a protection layer for preventing leakage through the power cable 106 or the communication interconnection 112. The protection layer may include an insulating sheath or cover. The protection layer can also prevent an operator of the monitor terminal 102 from getting shock. The protection layer can include an insulating cover to the electrical access connector 110, the communication interconnection 112, the modem component 114, the monitor component 116, or any combination thereof.

The monitor terminal 102 can optionally include advanced power electronic devices, such as a flexible AC transmission system (FACTS). These power electronic devices can be coupled to the communication interconnection 112. The FACTS is a system composed of static equipment. The power electronic devices can be used to enhance controllability of the power transmission. The power electronic devices can also increase power transfer capability of the power transmission through the communication interconnection 112 and the power cable 106.

The power line communication monitor system 100 can further include a neutral cable 122. The neutral cable 122 can be coupled to a current transformer 128, similar to the current transformer 119. One of the sensors 118, such as a current reader, can couple to the current transformer 128 to provide a power current reading of the power cable 106 to the monitor component 116. The neutral cable 122 is similar to the power cable 106 in structure, but does not carry power. The neutral cable 122 can include a conductor that carries current in normal operation, which may be connected to ground.

The power line communication monitor system 100 can include a neutral access device 124. The neutral access device 124 is similar to the electric access device 104 in structure, but coupled to the neutral cable 122. A neutral interconnection 126 can extend from the neutral access device 124 to the modem component 114 and the monitor component 116. The neutral interconnection 126, like the communication interconnection 112, can be a wire or a split wire that electrically connects to multiple destinations. Power signals through the communication interconnection 112 referenced by the neutral signal through the neutral interconnection 126 together provide the voltage reading for the modem component 114 and the monitor component 116.

Figure 2:
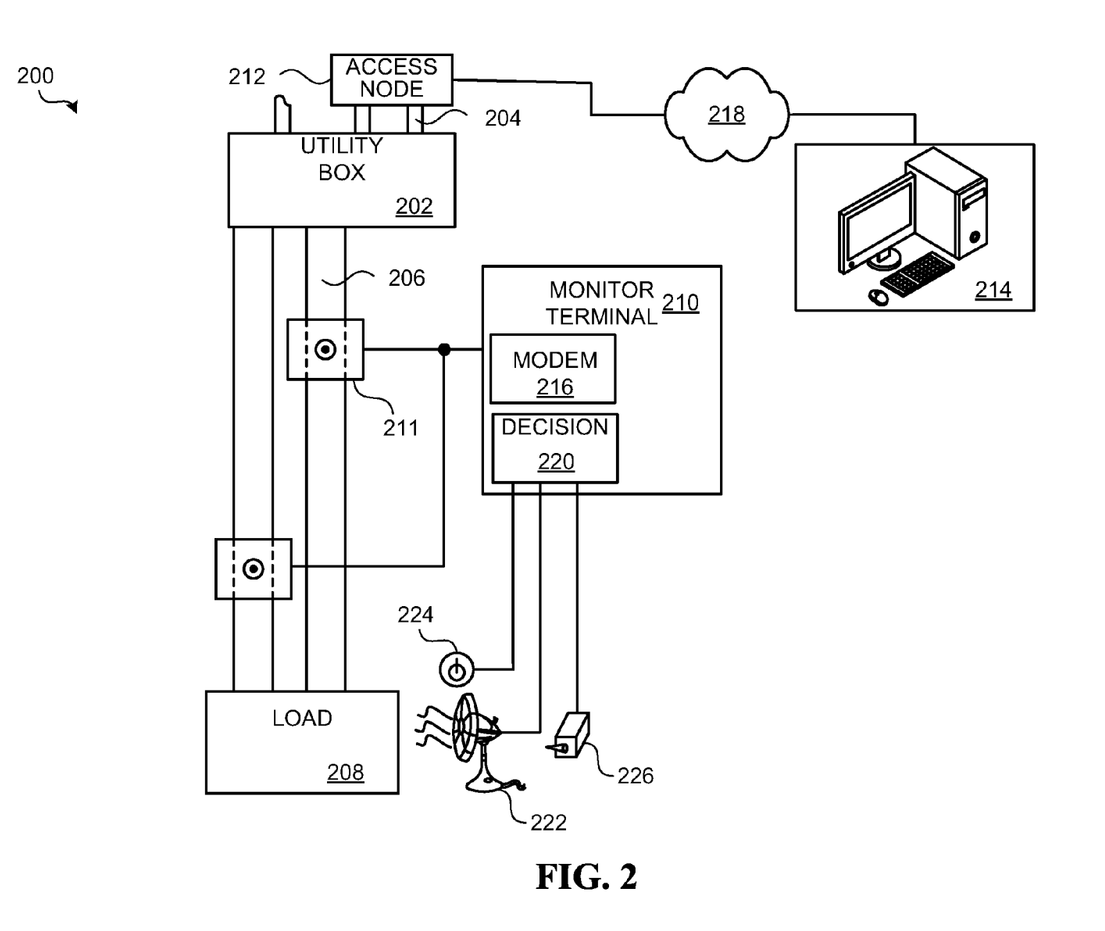
FIG. 2 illustrates a monitor system environment for operation of the power line communication monitor system.

Referring now to FIG. 2, therein is shown a monitor system environment 200 for operation of a power line communication monitor system. For example, the monitor system environment 200 can be an environment in which the power line communication monitor system 100 of FIG. 1 operates.

The environment can include a utility box 202. The utility box 202 is an enclosure in which power cables are congregated. For example, the utility box 202 can be a fuse box, an electric panel, a transformer station, or any combination thereof. The utility box 202 can be connected to power supply cables 204. The utility box 202 can also be connected to load cables 206. The power supply cables 204 are connected to a power source (not shown).

The load cables 206 are coupled to the utility box 202 and a load 208. The load cables 206 transfer power from the power cables to operate the load 208. The load 208 is a device powered by one or more of the load cables 206. For example, the load 208 can be an electronic or mechanical device.

The load cables 206 can be the power cable 106 of FIG. 1. A monitor terminal 210 can couple onto one or more of the load cables 206 with an electrical access device 211. The monitor terminal 210 can be the monitor terminal 102 of FIG. 1. The electrical access device 211 can be the electrical access device 104 of FIG. 1.

The power supply cables 204 can be coupled to an access node 212. The access node 212 is a communication device, such as a power line communication modem, a computer, a power line communication relay, a power line communication bridge device, or any combination thereof. The access node 212 can aggregate measurement data collected from one or more of the monitor terminal 210. The access node 212 can include a display for displaying all or a portion of the aggregated data. The access node 212 can be networked with an operation station 214. The access node 212 can send the aggregated data to the operation station 214.

The operation station 214 is a central monitor station, such as a user-operated computer, a computer server, a mobile device, networked cluster server, a distributed computing service, or any combination thereof. The operation station 214 includes a monitor application. The monitor application receives measurement reports from monitor terminals, such as the monitor terminal 210. The monitor application can display the measurement reports, and provide an interface for commands or messages to be sent out in response to the measurement reports. The commands or messages can also be sent out automatically, such as an automatic shutdown if unstable power metering is detected in the measurement reports.

The access node 212 can aggregate data collected by one or more of the monitor terminal 210 by decoding signals through the power supply cables 204. Alternatively, the access node 212 can relay the signals from the monitor terminal 210. The access node 212 can include a modem component 216 for encoding and decoding digital signals through the power supply cables 204. The modem component 216 can be constructed in the same way as the modem component 114 of FIG. 1 of the monitor terminal 102 of FIG. 1.

The access node 212 can be networked with the operation station 214 through a network channel 218. The network channel 218 can include a number of methods of digital or analog communication, including over power line Ethernet, cellular network, wireless Ethernet, or wired Ethernet. For example, the network channel 218 can be through the power line network that the power supply cables 204 are part of. For another example, the network channel 218 can be a WiFi network, where the access node 212 includes a WiFi adapter for communicating via WiFi with the operation station 214.

In one embodiment, the access node 212 can be considered as at the top of a network hierarchy of a power line communication network, wherein the access node 212 provides connectivity between the power line communication network and an external network, such as the network channel 218. The modem component 216 can be a slave node with respect to the access node 212, where the modem component 216 is at the bottom of the network hierarch. The modem component 216 can be connected to field equipment such as switch boards, circuit breakers, and etc.

Optionally, the access node 212 can be a bridge node for providing transparent flow of information between segments where connections over power line is not possible, e.g., at transformers. Each bridge node can run node communication software at the top layer of the protocol stack. In this configuration, each of the modem component 216 can either be connected directly to an access node at the top of a power line network hierarchy or be connected via a bridge node to the access node at the top of the power line network hierarchy.

The access node 212 can include a network layer for communication between one master access node and all slave nodes of the master, a Media Access Control (MAC) layer for providing addressing and channel access control, and a transport layer for providing transmission services. Optionally, the access node 212 can also include a server specific convergence layer including one or more manager components. For example, the one or more manager components can include a node side manager for communicating with field hardware and an AP side manager for communicating with a monitor application at the operation station 214. Optionally, the access node 212 can also include a common convergence layer. The common convergence layer is for providing IP level routing. The common convergence layer can ensure that a protocol data unit sent with a certain manager ID is delivered to the specific common convergence layer manager with that ID.

It has been discovered that the configuration above allows a high level of granularity to monitor power and other physical quantities along a power line. The configuration also has the advantage of improved response time and lowering of distance caps on the installation of monitor devices.

The operation station 214 can be placed in a variety of locations in the environment. The operation station 214 can be in the same building or facility as the access node 212, where the operation station 214 can communicate via power cables. The operation station 214 can also be in a remote facility, where the access node 212 can communicate with the operation station 214 via a wireless network, such as a cellular network.

The operation station 214 can include a display for displaying a dashboard of information collected from one or more of the access node 212 and one or more of the monitor terminal 210. The dashboard can include different visualization tools for analyzing the measurements collected by the one or more of the monitor terminal 210.

The monitor terminal 210, the operation station 214, or both can include a decision module 220 that can analyze the measurements and execute a command to a facility device 222 or the load 208 that is located proximate to the monitor terminal 210. For illustrative purposes, the decision module 220 is shown only in the monitor terminal 210, although it is understood that it can also be in the operation station 214. The facility device 222 is a device powered by a power line connected to a monitor device. The facility device 222 can be considered the same as the load 208 or another load of the load line 206. The facility device 222 can be an electronic or a mechanical device. For example, the facility device 222 can be a fan that is part of the load 208. The operation station 214 can determine from the measurements received from the monitor terminal 102 that a fan has malfunctioned. The operation station 214 can send a command to shutdown the fan.

The operation station 214 can also send a command to turn on or speed up other fans near the failed fan. The command can be delivered from the operation station 214 through the network channel 218 to the access node 212. The command can be encoded by the access node 212 through the power supply cables 204. The command can be read from the monitor terminal 210 via the load cables 206. The monitor terminal 210 can execute the command by adjusting the facility device 222, such as turning it on, turning it off, adjusting its components, adjusting its motors, adjusting its power, or any combination thereof The execution of a command can be through a switch, such as an electronic switch 224 to turn on and off the facility device 222. The execution of the command can also be through an actuator, such as an actuator 226 for mechanically controlling the facility device 222. The actuator 226 can be operated by the monitor device to control the facility device 222 of the power line, where the actuator 226 is for actuating a mechanical mechanism on the facility device 222.

Figure 3A:
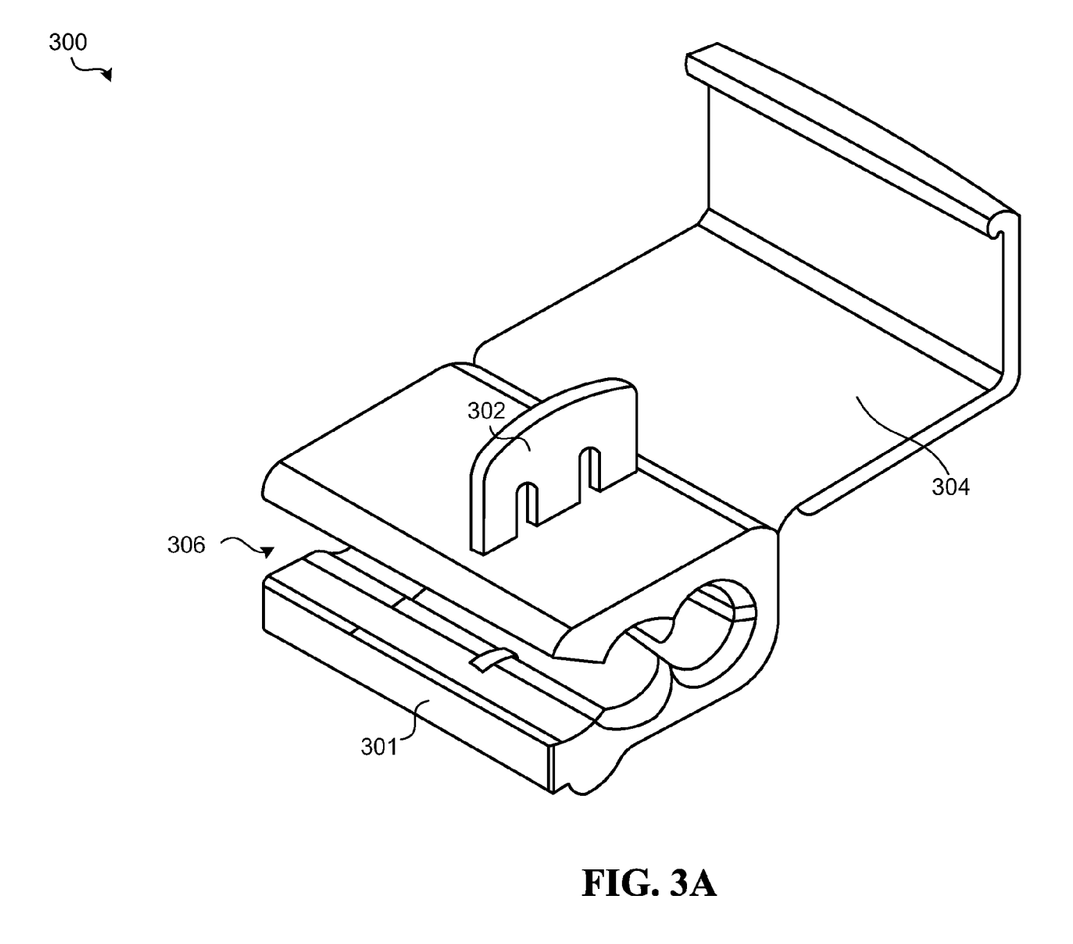
FIGS. 3A-3C illustrate an example of an electrical access device.
Figure 3B:
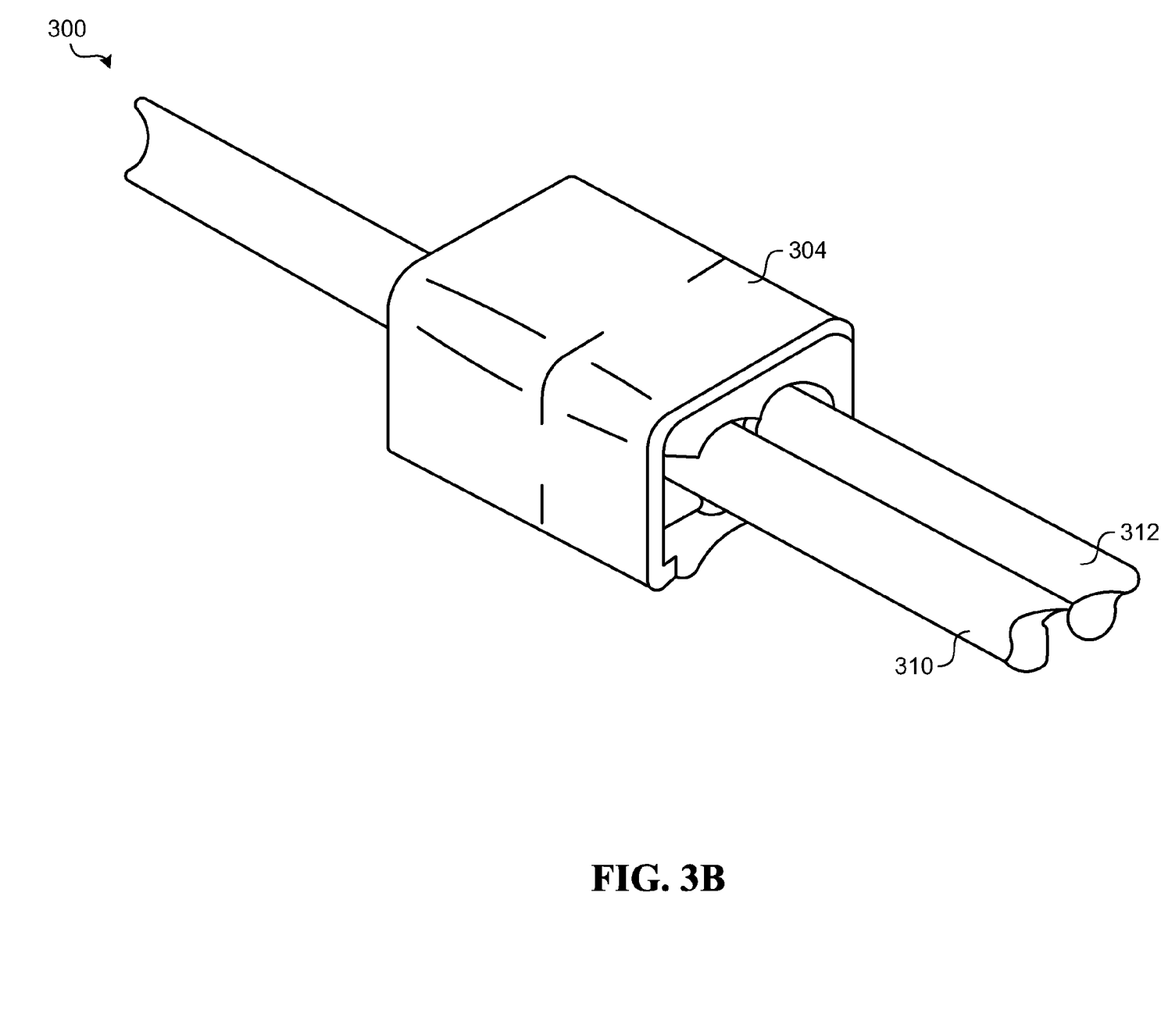
Figure 3C:
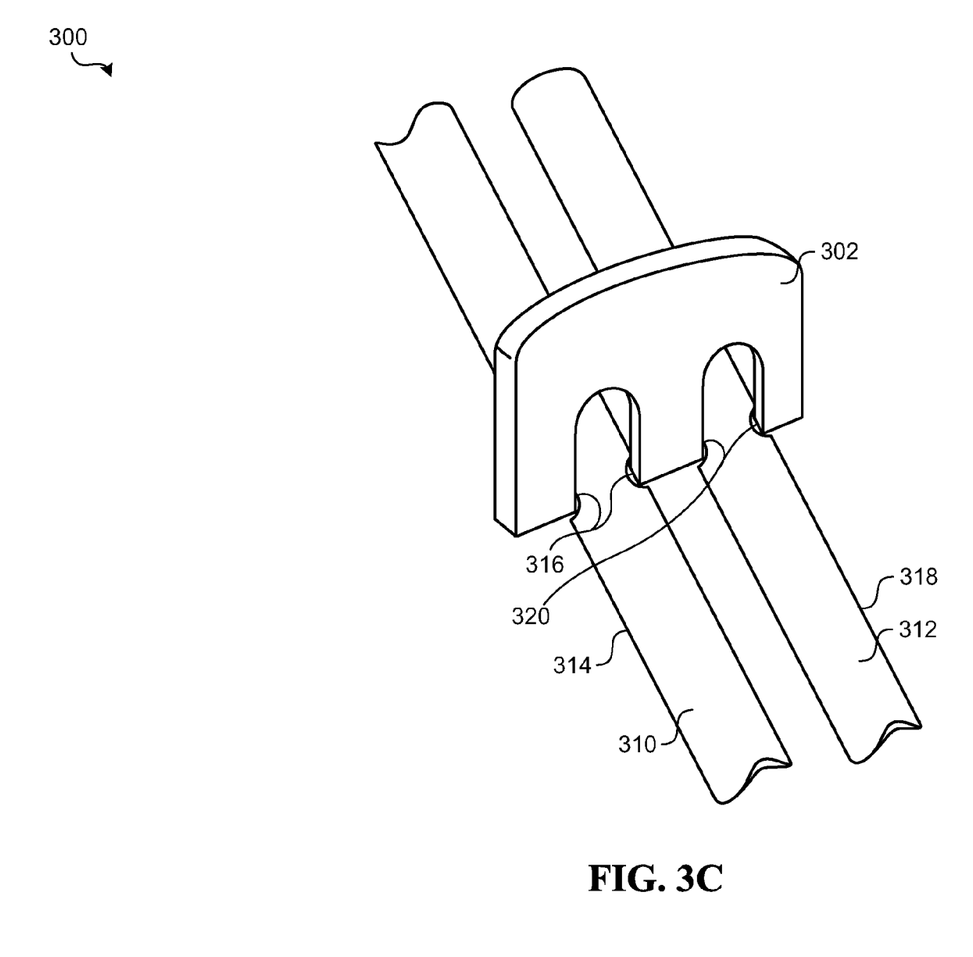

Referring now to FIGS. 3A-3C, therein are shown an example of an electrical access device 300. The electrical access device 300 can be the electrical access device 104 of FIG. 1. The electrical access device 300 is for providing electrical access to a power cable. The electrical access device 300 can be attached to a power cable drawing support from an attachment body 301. The attachment body 301 can be the attachment body 108 of FIG. 1. The attachment body is an insulating solid structure, such as plastic, ceramic, glass, wood, or any combination thereof.

FIG. 3A shows the electrical access device 300 with the insulation cover open. When open, the electrical access device 300 can include an electrical access connector 302. The electrical access connector 302 is a conductive structure for bridging electrical connection between two power cables. For example, the electrical access connector 302 can puncture an insulation sheath of a power cable. The electrical access connector 302 can be made of any conductive material, including copper, tin, iron, silver, gold, semi-conductor, or any combination thereof.

The electrical access connector 302 can be a self-stripping electrical tap connector with a probe connection. The electrical access connector 302 can trap onto the power line and make connections to a power line modem drawn off of this point through the probe connection. This is further illustrated by FIG. 3C.

The electrical access device 300 can includes an insulation cover 304. The insulation cover 304 is an insulating layer around the electrical access connector 302 to prevent electrical exposure of the electrical access connector 302. For example, the insulation cover 304 can be made of plastic or ceramic. The electrical access device 300 can include a cavity 306. The cavity 306 can allow one or more power cables to be secured onto the electrical access device 300.

FIG. 3B shows the electrical access device 300 in the closed configuration. In the closed configuration, the electrical access device 300 can enclose a portion of a power cable 310 and a portion of a communication interconnection 312. The power cable 310 can be the power cable 106 of FIG. 1. The communication interconnection 312 can be the communication interconnection 112 of FIG. 1 for electrically connecting with a monitor device. The insulation cover 304 can partially or completely surround the power cable 310.

FIG. 3C illustrates the closed configuration of the electrical access device 300 without showing the insulation cover 304 and the attachment body 301. In the closed configuration, the electrical access connector 302 can puncture both the power cable 310 and the communication interconnection 312 to bridge an electrical connection between the two. For example, FIG. 3C illustrates that an insulation sheath 314 of the power cable 310 is stripped open to expose an inner conductor 316 of the power cable 310. Similarly, an insulation sheath 318 of the communication interconnection 312 can be stripped open to expose an inner conductor 320 of the communication interconnection 312.

Figure 4A:
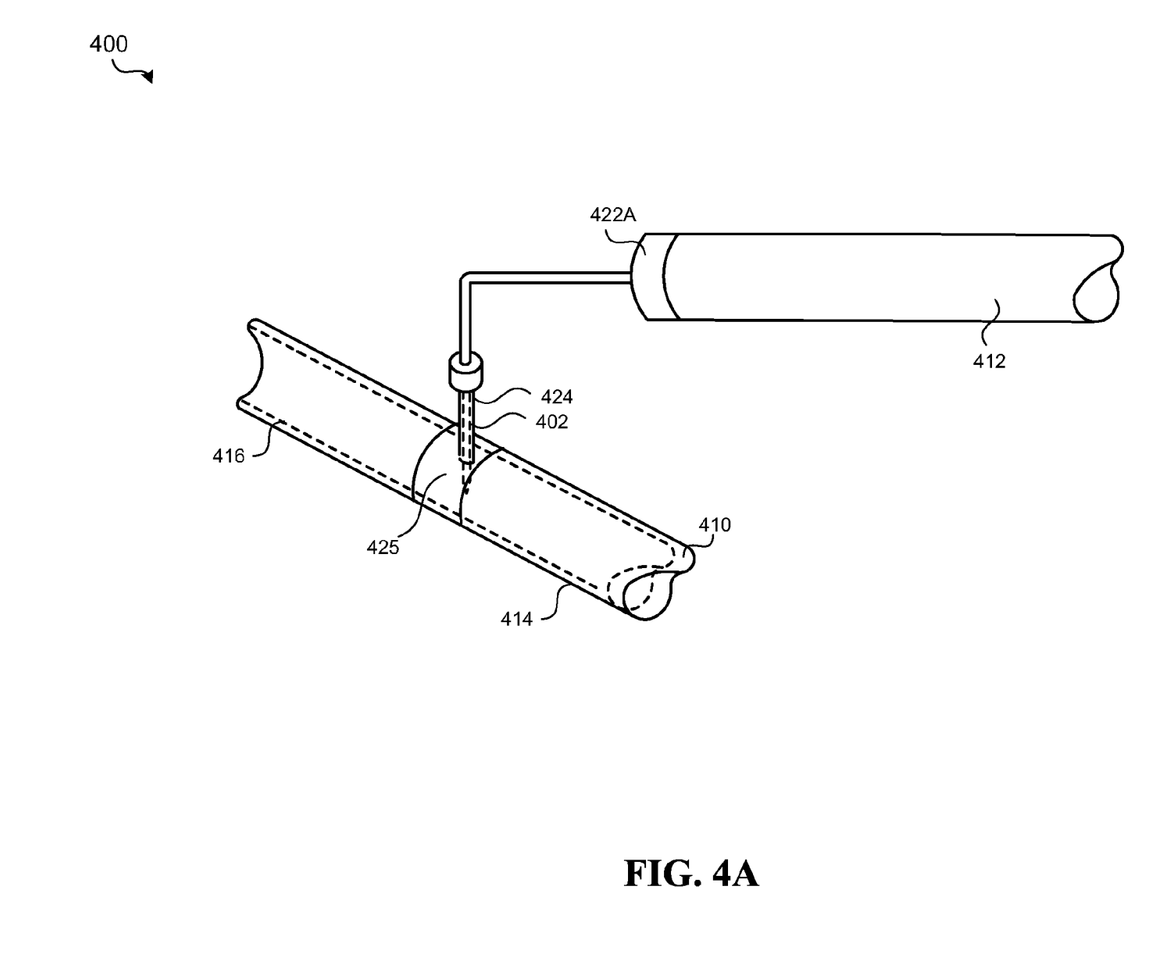
FIGS. 4A-4B illustrate other examples of an electrical access device.

FIG. 4A illustrates other examples of an electrical access device 400. The electrical access device 400 can be the electrical access device 104 of FIG. 1. Here, the electrical access device 400 can include an electrical access connector 402. The electrical access connector 402 is a conductive structure for bridging electrical connection between two power cables. For example, the electrical access connector 402 can puncture an insulation sheath 414 of a power cable 410 to contact an inner conductor 416 (illustrated by dotted lines) of the power cable 410. The electrical access connector 402 can be comprised of any conductive material, including copper, tin, iron, silver, gold, semi-conductor, or any combination thereof. A strap (not shown) can also be provided around the power cable 410 that secures the electrical access connector 402 to the power cable 410.

The electrical access connector 402 can then connect electrically via a bridge connector 422A with a communication interconnection 412. The bridge connector 422A is an extension of the electrical access connector 402. The communication interconnection 412 can be the communication interconnection 112 of FIG. 1. The bridge connector 422A can electrically connect the electrical access connector 402 to the communication interconnection 412.

The bridge connector 422A of the electrical access connector 402 can be a socket that connects to one end of the communication interconnection 412 as shown in FIG. 4A. The communication interconnection 412 can then couple to a power line communication device of the monitor device.

The electrical access connector 402 can be protected by an insulation layer 424. The insulation layer 424 can ensure that the electrical access connector 402 is not exposed electrically. For example, the insulation layer 424 can seal off the electrical access connector 402 at the site of insertion, making a seal together with the insulation sheath 414 of the power cable 410. The seal can be made with an insulation clamp 425 around the power cable 410 and the electrical access connector 402 to ensure no conductive material is exposed. The insulation layer 424 can surround an exposed portion of the electrical access connector 402 that is not inserted within the power cable 410. The connection from the electrical access connector 402 to the bridge connector 422A are all insulated with an insulation layer to prevent electrical shortage and leakage.

Figure 4B:
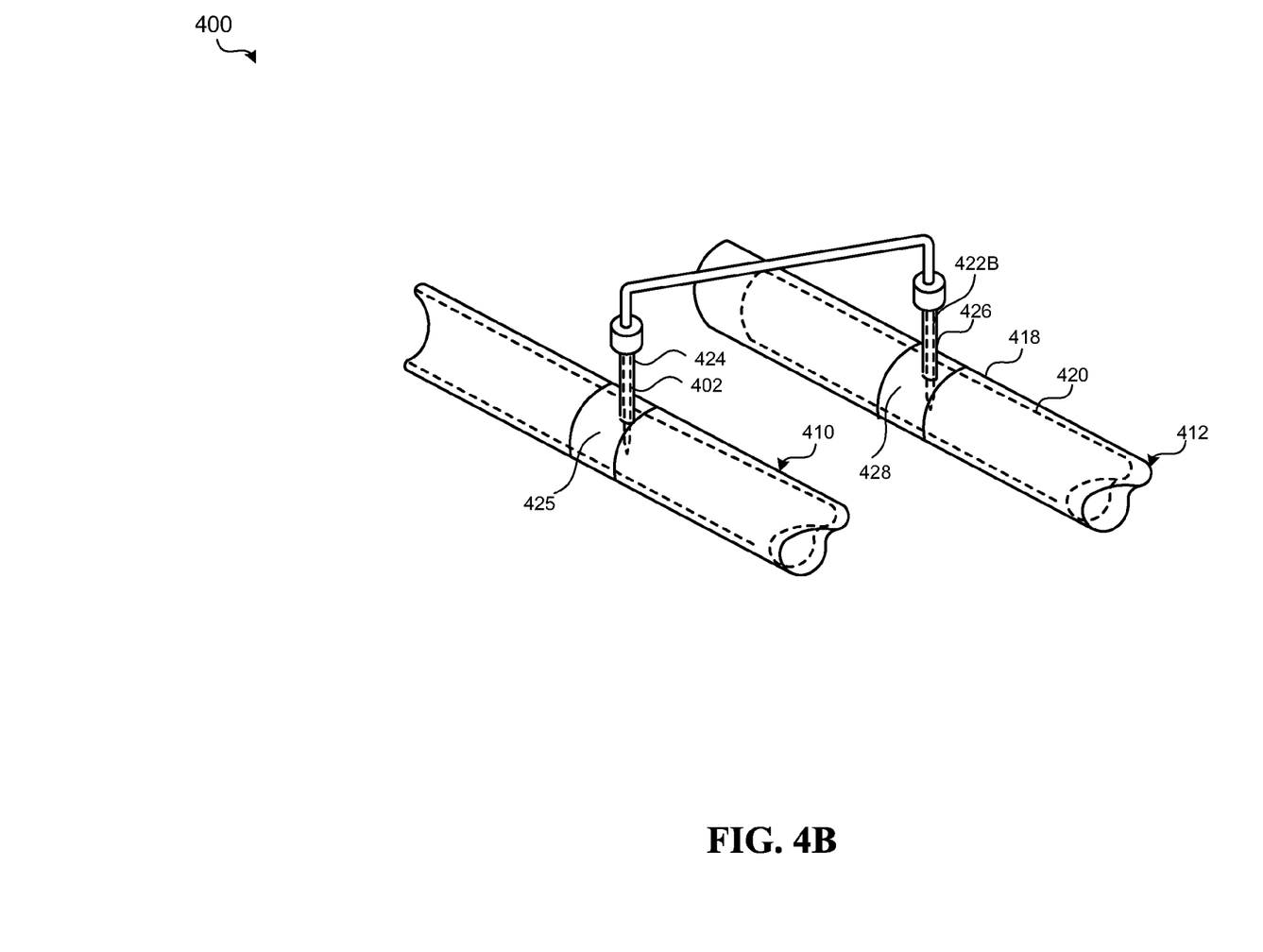

FIG. 4B illustrates a variation of the electrical access device 400. In this example, as an alternative to the bridge connector 422A, a bridge connector 422B is illustrated. The bridge connector 422B is connected to the electrical access connector 402 in the same way as illustrated by FIG. 4A. Here, the bridge connector 422B is a pin that punctures an insulation sheath 418 of the communication interconnection 412 to make electrical contact with an inner conductor 420 of the communication interconnection 412. The pin inserted is a conductor. A strap (not shown) can be provided around the communication interconnection 412 to secure the bridge connector 422B to the communication interconnection 412. The bridge connector 422B can be protected by an insulation layer 426. The insulation layer 426 can ensure that the bridge connector 422B is not exposed electrically. For example, the insulation layer 426 can seal off the bridge connector 422B at the site of insertion, making a seal together with the insulation sheath 418 of the communication interconnection 412. The seal can be made with an insulation clamp 428 around the communication interconnection 412 and the bridge connector 422B to ensure no conductive material is exposed The insulating layer 424 can be provided around the exposed portion of the bridge connector 422B that is not inserted within the communication interconnection 412.

Figure 5:
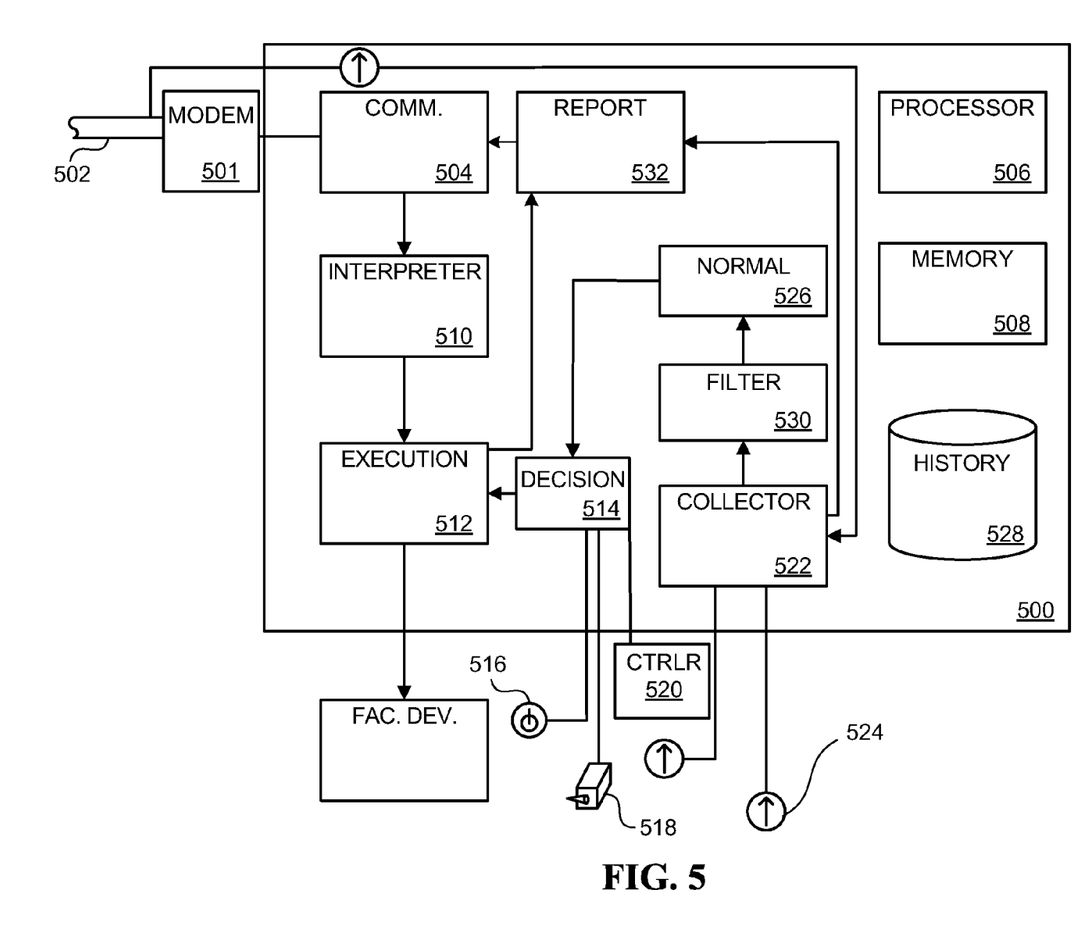
FIG. 5 is a block diagram of a monitor component.

Referring now to FIG. 5, therein is shown a block diagram of a monitor component 500. The monitor component 500 can be the monitor component 116 of FIG. 1. The monitor component can be connected to a communication interconnection 502. The communication interconnection 502 can be used to power the monitor component 500. For example, the communication interconnection 502 can be the communication interconnection 112 of FIG. 1.

The monitor component 500 can be coupled to a modem component 501 via a communication module 504. For example the modem component 501 can be the modem component 114 of FIG. 1. The modem component 501 can be connected to the communication interconnection 502 to encode signal through the communication interconnection 502 or to decode signal from the communication interconnection 502. The communication module 504 can send data, such as commands or measurements to the modem component for transfer. The data sent can be analog or digital. The communication module 504 can receive data, such as commands or feedback information from the modem component.

The monitor component 500 can include a battery (not shown) for powering on the monitor component 116. The battery can also be used as backup power when the communication interconnection 502 cannot provide adequate power on its own.

The monitor component 500 can include a central processor 506. The monitor component 116 can also include a memory 508. The central processor 506 can execute one or more software or firmware modules store on the memory 508. The central processor 506 can also facilitate execution of hardware modules to process the incoming and outgoing signals from the monitor component.

The monitor component 500 can include one or more processes of monitoring a data center facility. The one or more processes can be implemented by components, storages, and modules described below. The modules can be implemented as hardware components, software modules, or any combination thereof. For example, the modules described can be software modules implemented as instructions on a non-transitory memory capable of being executed by the central processor 506.

Each of the modules can operate individually and independently of other modules. Some or all of the modules can be combined into one module. A single module can also be divided into sub-modules, each performing separate method step or method steps of the single module. The modules can share access to a memory space, such as the memory 508. One module can access data accessed by or transformed by another module. The modules can be considered "coupled" to one another if they share a physical connection or a virtual connection, directly or indirectly, allowing data accessed or modified from one module to be accessed in another module.

The monitor component 500 can include additional, fewer, or different modules for various applications. Conventional components such as network interfaces, security functions, operating system, load balancers, and the like can be included.

The monitor component 500 can include a command interpreter module 510. The command interpreter module 510 can be coupled to the communication module 504 for receiving a command that is received by the communication module. The command interpreter module 510 can interpret the command receive. The command interpreter module 510 can determine whether the command can be executed and what conditions must be met in order to execute the command. The command interpreter module 510 can determine how to execute the command. The command interpreter module 510 can generate one or more instructions for a command execution module 512.

The monitor component 500 can include a decision module 514. The decision module 514 can be the decision module 220 of FIG. 2. The decision module 514 can determine whether an instruction needs to be sent to the facility device based on measured quantities of sensors.

The monitor component 500 can include the command execution module 512. The command execution module 512 is coupled to the command interpreter module 510 for receiving and executing the instructions interpreted by the command interpreter module 510. The command execution module 512 can also be coupled to the decision module 514 for receiving and executing the instructions from the decision module 514. The command execution module 512 can be coupled to facility devices, such as the facility device 222 of FIG. 2. The command execution module 512 can modulate its connection with the facility devices based on the instructions received, including turning one or more of the facility devices on or off. For example, the command execution module 512 can control an electric switch 516, an actuator 518, a controller 520, or any combination thereof. For example, the electric switch 516 can turn a fan on and off. For another example, the actuator 518 can mechanically move a computer tray. For yet another example, the controller 520 can control speed of a fan.

The monitor component 500 can include a collection module 522. The collection module 522 is for collecting the measurements of sensors 524. The collection module 522 can aggregate and store the measurements of the sensors 524 in the memory 508. The sensors 524 can be the sensors 118 of FIG. 1.

The monitor component 500 can include a normalization module 526. The normalization module 526 is for normalizing the measurements of the sensors 524. For example, the collection module 522 can store a history of the measurements in a history store 528 from each of the sensors 524 for the purpose of normalizing measurements reported based on historical data.

The monitor component 500 can include a filter module 530. The filter module 530 is for filtering the measurements of the sensors 524. For example, the filter module 530 can filter away low or high frequency variations of the sensors 524.

The monitor component 500 can include a report module 532. The report module 532 is for reporting the measurements of the sensors 524 to a monitor station, such as the operation station 214 of FIG. 2. The report module 532 can be coupled to the communication module 504 for transmitting or providing the measurements via power line communication.

Figure 6:
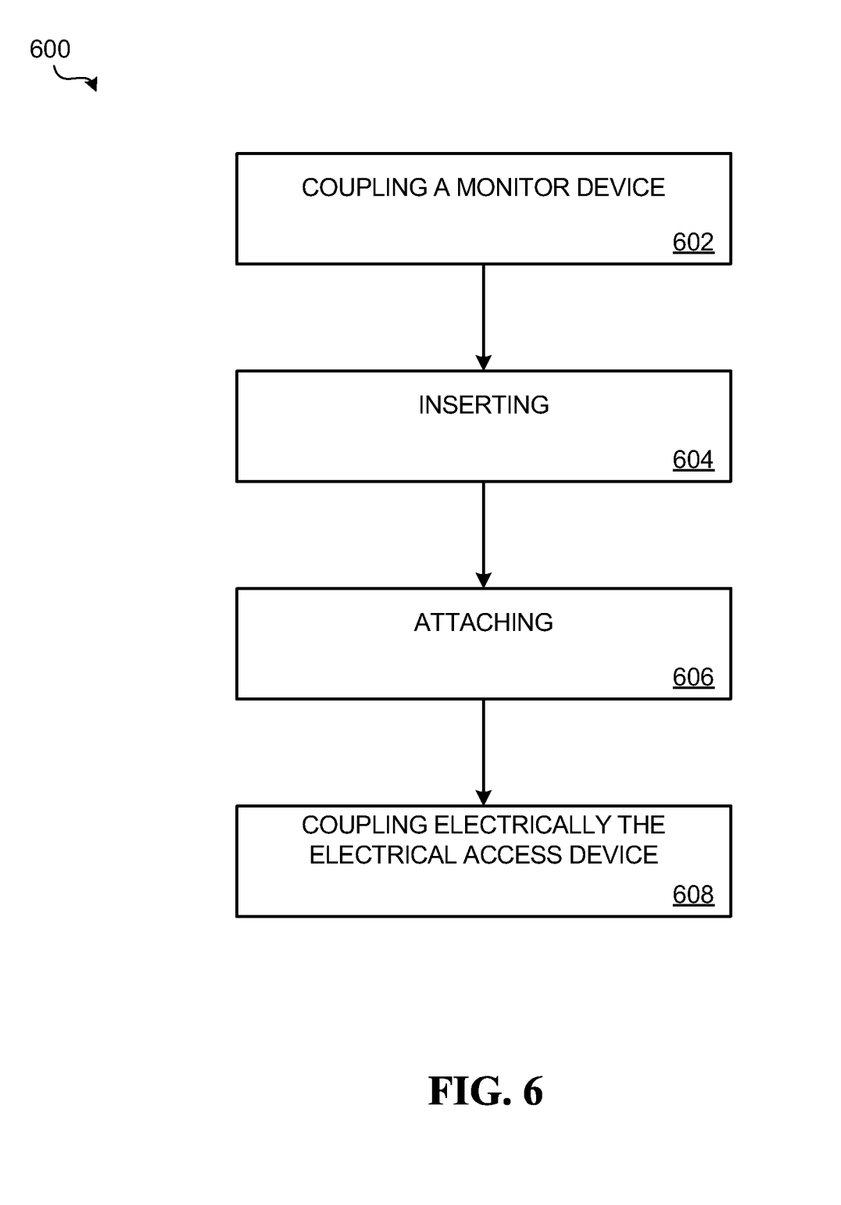
FIG. 6 is a flow chart of an embodiment of a method of deployment of a power monitor system.

Referring now to FIG. 6, therein is shown a flow chart of an embodiment of a method 600 of deployment of a power monitor system, such as the power line communication monitor system 100. The method 600 includes coupling a monitor device that has a measurement component to a power line communication device for communicating a physical quantity measured from the measurement component across a power line in a method step 602. In some embodiments, the power line communication device can be directly attached to the measurement component. The power line communication device can also be integrated with the monitor device.

The measurement component can measure one or more physical quantities. For example, the physical quantity can be an electrical property, a mechanical property, a spatial property, a temperature, a pressure reading, a lighting condition reading, a moisture reading, a weight reading, or any combination thereof.

The method 600 includes a method step 604 to electrically couple an electrical access device to the power line. The method step 604 includes inserting a connection tap of an electrical access device into the power line through an insulation sheath to a conductor within the power line. The method step 604 can include inserting an extension of the connection tap into an electrical interconnect, such as a wire, through a second insulation sheath to a second conductor of the electrical interconnect. The electrical interconnect can then be coupled to the power line communication device.

The method 600 further includes attaching the electrical access device to the power line in a method step 606. This step serves to secure the electrical access device to the power line. The method 600 also further includes coupling electrically the electrical access device to the monitor device and the power line communication device in a method step 608. This step serves to enable the monitor device to communicate via power line communication through the electrical access device.

During the deployment stage, other devices can be coupled to the monitor device. For example, an electronic switch can be coupled to the monitor device for switching on or off power supplied to a load of the power line. An actuator can also be coupled to the monitor device, where the monitor device can operate the actuator to actuate a mechanical mechanism on a load of the power line.

Figure 7:
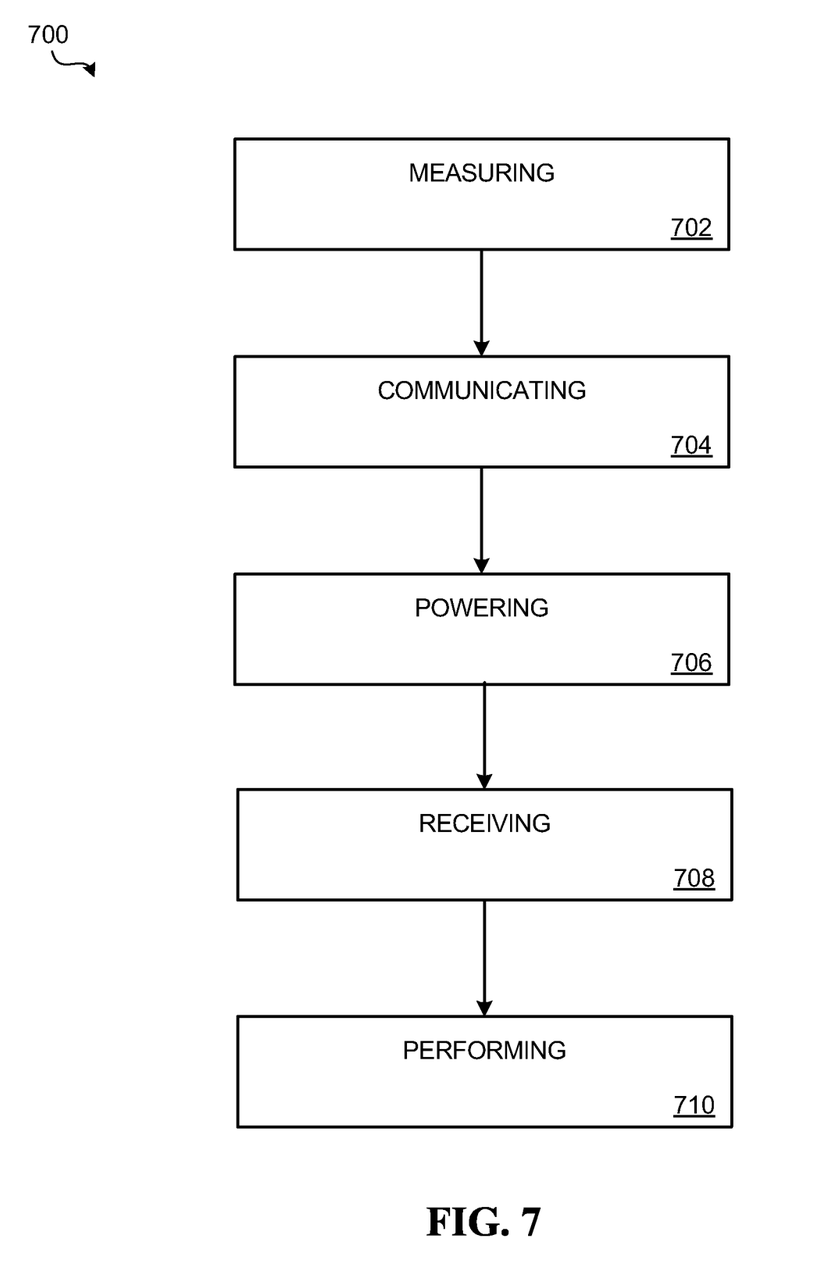
FIG. 7 is a flow chart of an embodiment of a method of operating a power monitor system.

Referring now to FIG. 7, therein is shown a flow chart of an embodiment of a method 700 of operating a power monitor system, such as the power line communication monitor system 100. The method 700 includes a method step 702 to collect physical quantity data. The method step 702 includes measuring a physical quantity with a measurement component of a monitor device.

The method 700 includes a method step 704 to communicate the measurement readings. The method step 704 includes communicating measurement messages across a power line with a power line communication device. The method 700 includes a method step 706 to power the monitor device and the power line communication device. The method step 706 includes powering the monitor device and the power line communication device through an electrical access device coupled to the power line, the electrical access device having a connection tap inserted into the power line through an insulation sheath to a conductor within the power line.

The power monitor system can be operated remotely by a command. For example the method 700 can include a method step 708 to receive a command. The method step 708 includes receiving a command message at the power line communication device. In response to the command message at a method step 710, the power monitor system can perform an action according to the command message. Performing the action can include flipping an electronic switch operated by the monitor device to adjust power supplied to a load of the power line. Performing the action can also include activating an actuator operated by the monitor device to actuate a mechanical mechanism on a load of the power line.

The above description and drawings are illustrative and are not to be construed as limiting the invention to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and such references mean at least one of the embodiments.

While processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

What is claimed is:

1. A power monitor system, comprising:
   a power line communication modem to communicate messages across a power line, wherein the power line communication modem communicates in accordance with a power line communication (PLC) protocol;
   a monitor device having a measurement component coupled to the power line communication modem, wherein the monitor device is configured to monitor an electrical property as measured by the measurement component across the power line, and communicate, via the power line communication modem over the power line, the measured electrical property to an external computing device;
   an electrical access device coupled to the power line, the electrical access device including a connection tap inserted into the power line to an electrical conductor within the power line, wherein the connection tap is electrically coupled to the power line communication modem and the measurement component; and
   wherein the monitor device includes a processor configured by executable instructions to process one or more commands received by the power line communication modem and from the external computing device as a response to communicating the electrical property to the external computing device, wherein the processor is configured to execute the commands by controlling a facility device at or substantially proximate to an electrical load of the power line and said controlling includes enabling or disabling the facility device.

2. The power monitor system of claim 1, further comprising:
   an electronic switch operated by the monitor device to switch on or off power supplied to the electrical load of the power line; and
   wherein the processor is configured to flip the electronic switch when a user command message is received at the power line communication modem after the measured electrical property is reported to a monitor terminal via the power line communication modem.

3. The power monitor system of claim 1,
   wherein the connection tap has an extension inserted into an electrical interconnect through a second insulation sheath to a second conductor of the electrical interconnect; and
   wherein the electrical interconnect is connected to the power line communication modem.

4. The power monitor system of claim 1, wherein the measurement component is an electric current reader connected to a current transformer coupled to the power line separate from the electrical access device.

5. The power monitor system of claim 1, further comprising:
   an actuator coupled to a load of the power line;
   wherein the processor is configured to activate the actuator when a command message is received at the power line communication modem.

6. The power monitor system of claim 1, wherein the power line communication modem is attached to the measurement component.

7. The power monitor system of claim 1, wherein the power line communication modem is attached to the electrical access device.

8. The power monitor system of claim 1, further comprising an interference protector around the electrical access device.

9. The power monitor system of claim 1, wherein the monitor device is coupled to an external measurement component located proximate to a load of the power line.

10. The power monitor system of claim 1, further comprising a fan speed adjustment device coupled to the monitor device attached to a cooling fan proximate to a load of the power line.

* * * * *